Aug. 25, 1959        C. A. VOSSBERG        2,901,630
SYNCHRONIZED RECYCLING DETECTOR FOR PULSED ENERGY
Filed Oct. 11, 1956
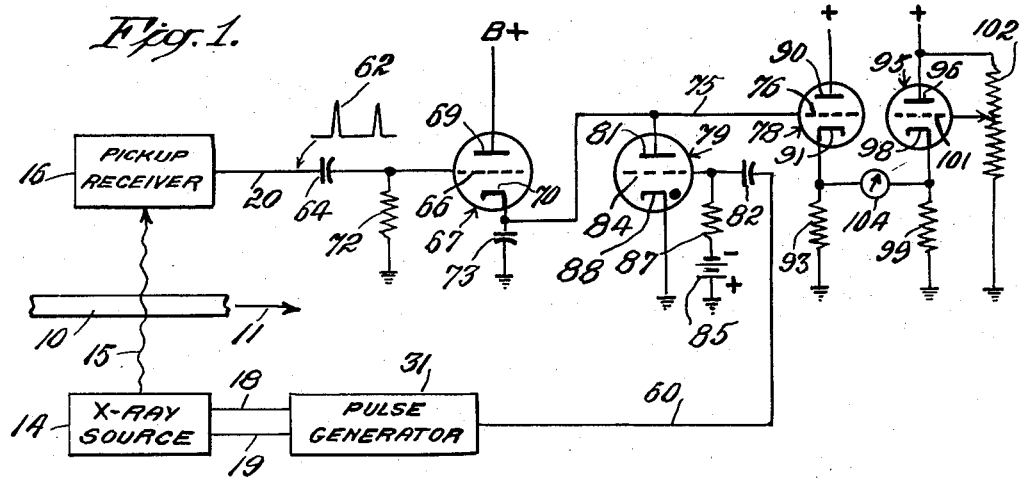
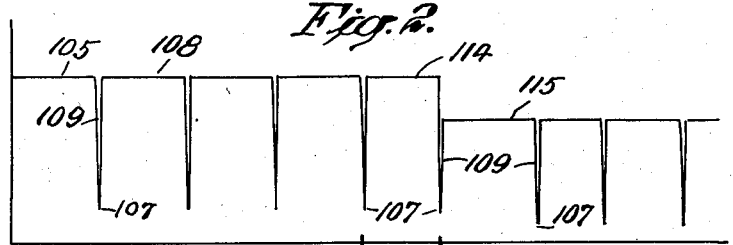
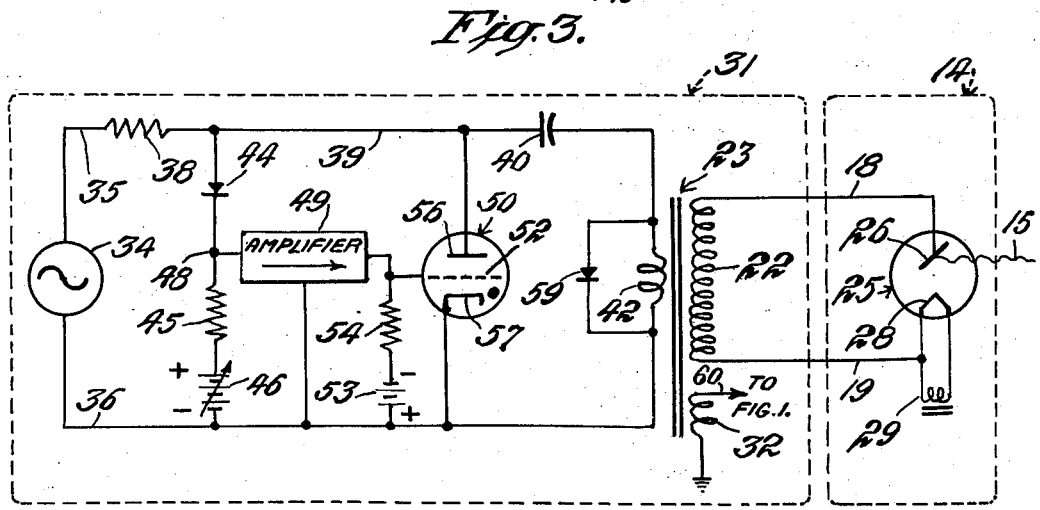
INVENTOR.
CARL A. VOSSBERG
BY
A. Stephen Baker
ATTORNEY United States Patent Office 2,901,630
Patented Aug. 25, 1959

2,901,630

SYNCHRONIZED RECYCLING DETECTOR FOR PULSED ENERGY

Carl A. Vossberg, Umatilla, Fla.

Application October 11, 1956, Serial No. 615,314

8 Claims. (Cl. 250—83.3)

The present invention relates to a recycling detector for pulsed energy, the recycling of the detector being synchronized to precede by a short but definite time interval the delivery of each energy pulse to which the detector responds.

The present application is a continuation-in-part of any copending application, serial No. 604,510, filed on August 16, 1956, now Patent No. 2,823,319, for a Precision Pulse Power Generator.

The recycling detector of the present invention is especially well suited for use in X-ray gauging apparatus where a characteristic of a test specimen is continuously measured by the measurement of variations in its X-ray transparency.

In an X-ray gauging system of this type, measuring means are required which evaluate the peak magnitude of a series of pulses which vary in peak amplitude. The variation in peak amplitude is caused by variations in the test specimen, usually a moving strip of metal, through which the X-ray pulses have passed.

The X-ray tube is energized by a series of voltage pulses to provide intermittent peaks of radiant energy. Each voltage pulse is individually tailored by a precision pulse generator so that the uniformity of each energy pulse emitted by the X-ray tube is maintained with a high degree of precision. These energy pulses are received by an X-ray pickup receiver which converts them into electrical pulses. In order to provide a precise and continuous measurement of any fluctuations in the X-ray transparency of the test specimen, it is necessary to obtain an accurately and individually measured evaluation of the peak intensity of each successive electrlical pulse produced by the X-ray pickup receiver. For this purpose a detector is required. A conventional peak voltage detector, by reason of inherent time lag, fails to respond instantaneously to a sudden decrease in peak intensity. The present invention, however, provides a novel form of detector which responds instantaneously by recycling immediately prior to each pulse. By "recycling," I mean that the detector is restored to a substantially constant preliminary condition wherein it may undertake the individual measurement of each successive pulse ab initio. As a result, any abrupt change and particularly a decrease, is immediately detected at the first pulse wherein such decrease occurs.

A separate recycling circuit extends from the pulse generator to the detector for the purpose of recycling the detector. As stated above, pulses of X-ray energy which have passed through the test specimen are received by an X-ray responsive pickup device which may include photoelectric means.

The recycling detector includes a measurement or storage capacitor which is repeatedly charged to a voltage which is directly related to the peak intensity of the radiant energy received by the X-ray responsive device after passage through the test specimen. The voltage across this capacitor remains constant between successive pulses and its magnitude is used for purposes of meaurement and control.

Immediately prior to the radiation of each X-ray pulse, the capacitor is discharged to a predetermined low preliminary voltage which may be zero. In this manner, the capacitor is conditioned to be charged to a separately evaluated voltage in response to each X-ray pulse. Any change in the test specimen which is present during any individual pulse is reflected in the voltage across the measurement capacitor after the reception of such pulse. Rapid fluctuations in the X-ray transparency of the test specimen may be readily accommodated by increasing the repetition rate of the pulses.

Various objects, features and advantages of the invention together with details of its construction and operation will be better understood from the following specification together with the accompanying drawing forming a part hereof.

Referring to the drawing:

Figure 1 is a diagrammatic representation of an embodiment of the invention, including a circuit diagram of the recycling detector;

Figure 2 is a waveshape diagram illustrating the terminal potential of the storage capacitor referred to above; and Figure 3 is a circuit diagram of a precision pulse power generator for exciting the X-ray tube.

Referring to Figure 1 of the drawing, there is shown an X-ray thickness gauge system for continuously measuring the thickness of a specimen 10. The specimen 10 may be a strip of metal such as steel, for example, which is passing through a rolling mill or other processing apparatus, the direction of movement of the strip being indicated by the arrow 11. A source of X-rays 14, illustrated in greater detail in Figure 3, is arranged to direct X-rays 15 through the test specimen 10 to an X-ray pickup receiver 16. The source 14 may conveniently be an X-ray tube of the conventional heated cathode type, its cathode being connected to a conductor 19 and its target or anode connected to a further energizing conductor 18. The pickup receiver 16 may be of conventional type comprising a fluorescent screen disposed in the path of the X-rays 15 together with a photocell of the electron multiplier type arranged for quantitative response to the intensity of fluorescence of the screen. The circuit of the photocell is arranged in conventional manner so that a series of positive-going pulses are applied to a detector input conductor 20 in response to pulses of X-ray energy received by the pickup 16 from the X-ray source 14, as described in greater detail below. By "detector" is meant the apparatus as shown in Figure 1 excluding the X-ray generating and pickup elements 14 and 16 respectively, and the pulse generator 31.

High voltage energy for the X-ray source 14 is supplied over conductors 18 and 19 from the secondary winding 22 of a pulsing transformer 23 shown in Figure 3. As shown in Figure 3, the X-ray source 14 comprises an X-ray tube having an anode 26 connected to conductor 18. The X-ray tube 25 has a cathode 28 connected to conductor 19. The cathode 28 is heated by current from a low voltage transformer secondary winding 29.

The conductors 18 and 19 are energized from a pulse generator 31 which includes the transformer secondary winding 22 of pulsing transformer 23 referred to above. The pulse generator 31 of Figure 3 is substantially the same as the pulse generator shown in Figure 1 of my copending application Serial No. 604,510, filed on August 16, 1956, for a Precision Pulse Power Generator. It is to be understood that the conductors 18 and 19 may alternatively by connected to the transformer secondary winding 28, shown in Figure 3 of said copending application, the transformer 17 of said application being modified to include a tertiary winding as exemplified by the tertiary winding 32 shown in Figure 3 of the present application. Additionally, the modification illustrated in Figure 3 of said copending application may be embodied in the pulse generator 31 of the present application, if desired.

Referring to Figure 3 of the present application, the pulse generator 31 comprises a source of alternating current 34 which is connected to power supply conductors 35 and 36. The supply conductors 35 and 36 may be the usual commercial power mains. Power supply conductor 35 is connected through a current limiting resistor 38 and a conductor 39 to one terminal of a pulsing capacitor 40. The other terminal of capacitor 40 is connected to power supply conductor 36 through a primary winding 42 of the pulsing transformer 23. Conductor 39 is also connected to a threshold circuit comprising a unidirectionally conductive diode 44, a resistor 45 and a source of adjustable reference potential diagrammatically indicated as an adjustable battery 46. The source of reference potential 46 provides a constant and highly stable source of direct current potential. The junction 48 between diode 44 and resistor 45 in the threshold circuit 44, 45, 46 is connected through an amplifier 49 to a fast-acting circuit control or switching device illustratively shown as a thyratron 50. The output of amplifier 49 is connected to the control grid 52 of thyratron 50. The thyratron 50 is normally biased to cut-off by a biasing potential derived from a battery 53 through a grid resistor 54. The anode 56 and cathode 57 of thyratron 50 are so connected between conductors 39 and 36 as to discharge the capacitor 40 through the transformer primary winding 42 as described below.

In operation, the capacitor 40 becomes charged as the voltage on conductor 39 rises in a positive going direction with respect to conductor 36. When this potential reaches an instantaneous magnitude determined by the reference source 46, current commences to flow through diode 44 and resistor 45. The accompanying rising positive potential drop across resistor 45 in the threshold circuit 44—45—46 is amplified by amplifier 49 causing the thyratron 50 to fire. This discharges an accurately predetermined quantity of electricity at an accurately predetermined voltage into the primary winding 42 of the pulsing transformer 23. This discharge causes the pulsing transformer 23 to generate an accurately dimensioned pulse in its secondary winding 22 which, in turn, produces a precisely predetermined output pulse of radiant energy from the X-ray tube 25. During charging of capacitor 40, the charging current is limited by the limiting resistor 38 and the voltage induced in transformer secondary winding 22 is of small magnitude. Moreover, the voltage generated by the charging current is of incorrect polarity for the generation of X-rays by the X-ray tube 25. During the negative-going portion of each cycle, the current flowing through the transformer primary winding 42 may be conveniently reduced by a diode 59 shunted across the primary winding 42, this current being further limited by the limiting resistor 38. In this manner, the X-ray tube 25 is energized by a regularly repeated series of precisely uniform electrical pulses which in turn produces a series of regularly repeated precisely uniform pulses of X-ray energy, this pulsed energy being directed as indicated at 15 through the test specimen 10 to the pickup receiver 16. The X-ray energy reaching the pickup receiver 16 is thus made independent of line voltage fluctuations in the supply conductors 35 and 36.

The tertiary winding 32 is illustratively shown as a means of providing a recycling conductor 60 with recycling pulses which are synchronized with the electrical pulses supplied to the X-ray tube 23. The tertiary winding 32 may additionally provide capacitative coupling to the pulse generator 31 by reason of the physical proximity of the transformer windings 22 and 32 to each other. Other forms of coupling may be used for supplying recycling pulses to conductor 60, if desired, so long as no significant time delay is produced between the pulses delivered to the X-ray tube 23 and the recycling pulses which are delivered to the conductor 60. As described below, the recycling pulses must precede the pulses to be measured by the detector.

The output pulses from the pickup receiver 16 have a wave-shape as indicated at 62 and the peak amplitudes of successive pulses will vary in accordance with variations in the thickness of the specimen 10 or other factors affecting the X-ray opacity of the specimen 10. The measurement pulses indicated at 62 are transmitted over the detector input conductor 20 and through a coupling capacitor 64 to the control grid 66 of a triode 67 which is connected as a peak voltage detector. The detector triode 67 comprises an anode 69 and a cathode 70. The anode 69 is connected directly to a suitable source of anode potential designated B+. The grid 66 of detector 67 is grounded through a suitable grid resistor 72. A measurement capacitor 73 is connected in the ground return circuit of detector cathode 70. The cathode 70 of detector 67 is also connected by a conductor 75 to the grid 76 of a measurement triode 78, later to be described.

A recycling triode 79, which may be a gas discharge tube, has an anode 81 which is connected to conductor 75 for discharging the measurement capacitor 73 in response to each recycling pulse received from pulse generator 31 over conductor 60. For this purpose, the recycling conductor 60 is connected through a coupling capacitor 82 to the grid 84 of recycling triode 79. The grid 84 of recycling triode 79 is normally maintained biased to cut-off by a suitable source of biasing potential 85 illustratively shown as a battery, the biasing potential being applied to the grid 84 through a grid resistor 87. The recycling triode 79 has a cathode 88 which is shown returned directly to ground. If it should be desired to discharge the measurement capacitor 73 to a preliminary potential of zero or to some negative value of preliminary potential, the cathode 88 may be connected to a suitable source of negative potential instead of to ground as shown.

The measurement triode 78 has an anode 90 which is connected directly to a source of anode potential B+. The measurement triode 78 also has a cathode 91 which is returned to ground through a cathode resistor 93. There is a calibration or balancing triode 95 which also has an anode 96 connected directly to the source of anode potential B+. The balancing triode 95 likewise has a cathode 98 which is returned to ground through a cathode resistor 99. The measurement and balancing triodes 78 and 95 have similar characteristics and their respective cathode resistors 93 and 99 are equal. The balancing triode 95 has a grid 101 which is connected to an adjustably fixed source of positive potential derived from the movable contact of a potentiometer 102, the potentiometer 102 being connected between the source of anode potential B+ and ground. An indicator 104 is connected between the cathodes 91 and 98 of the measurement and balancing triodes 78 and 95, respectively. The indicator 104 may comprise a movement of the D'Arsonval type and may have a zero-center scale with a suitable pointer for indicating deviations from a predetermined nominal value. The indicator 104 may be set to zero under calibration conditions by adjustment of the potentiometer 102.

In operation, the pulses of radiant energy which have passed through the specimen 10 and have been picked up by the pickup receiver 16 appear on conductor 20 as a series of positive going measurement pulses as indicated at 62. The peak magnitude of each pulse is determined by the X-ray opacity of the specimen 10 at the time when the X-ray energy pulse passes therethrough. So long as this opacity remains constant, the measurement pulses will be of uniform peak amplitude. Any variations in opacity will be accompanied by corresponding variations in the peak amplitudes of successive ones of the pulses 62 on conductor 63. Each pulse causes the peak detector triode 67 to become conductive whereby the measurement capacitor 73 is charged to a potential determined by the peak magnitude of such pulse. The measurement capacitor 73 remains charged at this potential as indicated by the plateau 105 in Figure 2. Slightly prior to and immediately preceding the time when the next measurement pulse arrives at the grid 66 of the peak voltage triode 67, a recycling pulse is transmitted over conductor 60 to the recycling triode 79. The recycling triode 79 then becomes conductive and discharges the measurement capacitor 73 to a preliminary voltage indicated at 107 in Figure 2 which is determined by the internal potential drop in the anode-cathode circuit of recycling triode 79. As stated above, the voltage 107 may be made zero or negative by returning the cathode 88 of recycling triode 79 to a source of negative potential instead of directly to ground. Immediately after discharge of the measurement capacitor 73 by the recycling pulse, the accompanying measurement pulse arrives at the peak voltage triode 67 and recharges capacitor 73 to a new voltage the magnitude of which is separately and independently determined by the peak magnitude of the measurement pulse immediately following the recycling pulse which discharged the capacitor 73 to the voltage 107. This new peak voltage is indicated by the subsequent plateau 108. Assuming the leakage of capacitor 73 to be negligible and no grid current to be drawn by the measurement triode 78, the plateau 105 and the plateau 108 will both be straight horizontal lines separated by a deep and narrow crevasse 109 with the minimum voltage 107 defining the bottom of the crevasse. The time difference which determines the width of the crevasse 109 may be produced by an inherent difference in transit times of the measurement pulses and the recycling pulses. The path of travel of the measurement pulses includes the X-ray source 14 and the pickup receiver 16, both of which may have some slight time delay effect, sufficient to produce the crevasse 109 and thereby permit the measurement capacitor 73 to be discharged to an adequately low preliminary potential before it is recharged. In the event that the inherent time delay in the transmission path including the X-ray source 14, the specimen 10 and the pickup receiver 16 should be insufficient, a suitable delay network may be included in this transmission path in known manner.

In Figure 2, it has been assumed that an abupt change in the thickness of specimen 10 has occurred at some instant during the time interval between the time indicated at 111 on the time axis and the time indicated a 112. During this interval, the plateau 114 remained flat because the voltage of storage capacitor 73 remained constant in the absence of a recycling pulse. However, the recycling pulse discharges capacitor 73 so that upon receipt of the next measurement pulse at time 112, the capacitor 73 has been at least partially discharged. It is then recharged to a new potential by the measurement pulse in conformity with the increased specimen thickness as indicated by the plateau 115 which is at a lower level than the immediately preceding plateau 114. Successive plateaus will remain at the same level in the absenec of a change in the X-ray transparency of the portion of the moving specimen 10 which is traversed by X-rays 15. Any change in the specimen 10 will be immediately reflected by a corresponding change in the level of the next succeeding plateau.

Because the level of each voltage plateau is held constant between successive measurement pulses, the recycling and measurement pulses need not be of uniform spacing although uniform spacing is inherently provided by the pulse generator 31. In any event, however, the time interval between each recycling pulse and its accompanying measurement pulse which follows the recycling pulse by a short interval should be reasonably constant in order to avoid variations in the widths of successive crevasses such as crevasse 109.

It will be appreciated that instead of, or in addition to the indicator 104, other utilization means such as a control circuit (not shown) may be connected between the cathodes 91 and 98 whereby a corrective action may be derived, such as varying the rolling pressure applied to specimen 10 so that uniform thickness is obtained.

From the foregoing, it will be seen that the detector triode 67 is not required to accept high voltage peaks which are averaged and delivered at its output as a greatly reduced average voltage. On the contrary, the output voltage may be high relative to the peak input voltages of the pulses. Moreover, the output at indicator 104 is independent of the time base or width of each pulse and sharp, narrow pulses may be measured. The present recycling detector may therefore advantageously be used to measure and accurately evaluate the peak values of pulses which are very sharp and narrow and which have an extremely low average value because of the short duration of each pulse.

The invention thus provides a peak intensity measuring device wherein the peak magnitude of each successive pulse is carried forward individually by memory or storage means exemplified by the measurement capacitor 73. The capacitor 73 retains its full charge because the conductor 75 presents a high resistance to ground, except when the recycling triode 79 is conductive if it is a vacuum tube, or is in fired condition if it is a gas filled tube. The grid circuit of measurement triode 78 is of high impedance drawing no appreciable grid current which would reduce the voltage across the measurement capacitor 73 between recycling pulses. The voltage of measurement capacitor 73 therefore remains constant between pulses and drops only during the time-magnitude crevasses 109 between adjacent measurement plateaus such as plateau 105 and plateau 108. An abrupt drop is presented, however between the respective levels of plateau 114 and plateau 115. As compared with a conventional peak voltage measurement devices wherein the peak measurement voltage is stored in a capacitor, the recycling detector of the present invention provides the same rapidity of response to decreases in peak voltage as it does to increases. As previously stated, resolution of rapid fluctuations in the thickness of the specimen 10 may be readily effected by increasing the repetition rate of the pulses.

Additionally, the recycling detector of the present invention supplies an almost pure direct current to the indicator 104 so long as the measurement impulses are of constant peak amplitude. The widths of the crevasses 109 are sufficiently narrow to have no appreciable effect on the average value of a series of plateaus of uniform height as compared with the individual height of each plateau. This is in contrast to a conventional detector of the averaging type which must be provided with a ripple filter or must be otherwise arranged to eliminate the frequency corresponding to the repetition rate of the pulses. Such a ripple filter will obviously increase the response time of the detector and thereby retard the action of the indicator and/or control circuit. Thus, an important feature of the invention is its substantially instantaneous response to a single impulse of reduced peak amplitude. The forced discharge of the measuring capacitor 73 by the recycling triode 79 resets the detector to respond individually to the actual peak intensity of each individual pulse.

In the foregoing, the recycling detector of the present invention has been specifically disclosed with reference to the continuous thickness gauging of a longitudinally moving metal strip. It will be appreciated, however, that this recycling detector may be advantageously utilized in conjunction with accessory and auxiliary apparatus such as sorters, markers, counters and similar devices wherein pulsed energy is used to obtain an indication or a control effect in accordance with a particular measurement of an individual specimen. The pulsed energy measurement need not necessarily be made with respect to a continuous moving strip as described above, but may be applied to individual members of a series of separate articles or units, such as cut sheets of metal, the individual measurement for each unit of the series being used for counting, sorting, identifying or similar purposes.

When dealing with a series of individual specimens, the available time for each measurement may be so short that only a few pulses of energy are actually available for measuring each individual member of the series. By virtue of its novel memory or storage action, the recycling detector of the present invention will provide a sustained indication between successive pulses, the indication always being subject to correction in conformity with any modification in the peak value of each individual successive measurement pulse. In this manner, the undesirable integrating effects of conventional detectors are avoided and a sustained useful output is obtained which is readily useable with trigger circuits, for example, to control sorting, counting or similar apparatus in accordance with the results of each pulsed energy measurement. In this connection, if a chopper were to be used in conjunction with a conventional detector, the detector output would be affected by any variations in phase relationship between the chopper and the energy pulses used for measurement. Such difficulties are obviated by the present recycling detector.

While I have shown what I believe to be the best embodiments of my invention, it will be apparent to those skilled in the art that many changes and modifications may be made in the recycling detector herein specifically disclosed without departing from the spirit and scope of the invention as defined in the appended claims.

What is claimed is:

1. Apparatus of the class described for effectively continuous response to the varying peak magnitudes of a series of measurement pulses, said apparatus comprising in combination, peak amplitude responsive means to which said measurement pulses are applied, storage means connected to said peak amplitude responsive means for response thereto, recycling means connected to said storage means for at least partially clearing said storage means immediately prior to the application of each measurement pulse to said peak amplitude responsive means, and utilization means connected to said storage means.

2. Measurement apparatus for the effectively continuous measurement of the peak magnitudes of a series of measurement pulses, said apparatus comprising in combination, peak amplitude measurement means to which said pulses are applied, storage means connected to said peak amplitude measurement means for prolonging the duration of the result of the measurement of each measurement pulse, recycling means connected to said storage means for removing the effect of each measurement pulse immediately prior to the application of the next measurement pulse to said peak amplitude measuring means, and quantitatively responsive utilization means connected to said storage means.

3. Pulse evaluating apparatus of the class described comprising in combination, a source of successive measurement pulses the peak amplitudes of which are to be continuously evaluated, means for converting said measurement pulses to voltage pulses of peak amplitudes corresponding individually to the respective peak amplitudes of said measurement pulses, peak voltage responsive means connected to receive said voltage pulses, said peak voltage means including a capacitor which becomes charged to a potential having a magnitude which varies in accordance with the peak magnitude of each voltage pulse, recycling means connected to discharge said capacitor repeatedly, each discharge of said capacitor occurring immediately prior to the application of one of said voltage pulses to said peak voltage responsive means, and utilization means connected to said capacitor and responsive to the voltage to which said capacitor is charged.

4. Gauging apparatus of the class described, comprising in combination, a source of X-rays disposed to direct X-rays toward a specimen to be gauged, X-ray pickup means disposed to receive said X-rays after passage through said specimen and to produce an output having a magnitude in accordance with the instantaneous intensity of the X-rays received from said source, precision pulse generating means connected to energize said source with a series of energizing pulses of uniform peak amplitude and waveshape whereby a series of measurement pulses is produced by said pickup means, peak voltage responsive means connected to said pickup means, said peak voltage responsive means including a measurement capacitor which becomes repeatedly charged to a potential individually determined by the peak amplitude of each of said measurement pulses, recycling means connected to said pulse generator to receive recycling pulses therefrom, each recycling pulse immediately preceding one of said measurement pulses by a time interval of short duration with respect to the time interval between successive energizing pulses, said recycling means being connected to said measurement capacitor to discharge said capacitor at least partially in response to each recycling pulse, and voltage responsive utilization means connected to said measurement capacitor.

5. Gauging apparatus according to claim 4, in which said recycling means comprises a gaseous discharge tube having an anode, a cathode and a control grid, the anode-cathode circuit of said discharge tube being connected to discharge said measurement capacitor and the control grid of said discharge tube being connected to have said recycling pulses applied thereto.

6. Gauging apparatus according to claim 4, in which said voltage responsive means is substantially non-conductive, whereby said measurement capacitor retains its charge between successive recycling pulses.

7. Gauging apparatus according to claim 4, in which said recycling means is connected to said pulse generator to receive recycling pulses therefrom which are produced simultaneously with said energizing pulses, said time interval of short duration being produced by delay inherent in a transmission path including said source, said specimen and said pickup means.

8. Gauging apparatus according to claim 7 wherein said pulse generator includes a pulsing capacitor and means for repeatedly discharging said pulsing capacitor from a precisely predetermined potential to produce said energizing pulses, said recycling means being coupled to the discharge circuit of said pulsing capacitor to receive recycling pulses therefrom, said time interval of short duration being produced by delay inherent in a transmission path including said source of X-rays, said specimen and said pickup means.

References Cited in the file of this patent
UNITED STATES PATENTS

| 2,542,822 | Longini | Feb. 20, 1951 |
| 2,653,247 | Lundahl | Sept. 22, 1953 |
| 2,672,561 | Lichtman | Mar. 16, 1954 |
| 2,824,973 | Gundlach et al. | Feb. 25, 1958 |